(12) United States Patent
Rodewald

(10) Patent No.: US 7,616,952 B2
(45) Date of Patent: Nov. 10, 2009

(54) TELECOMMUNICATIONS SYSTEM, METHOD OF CONFIGURING SAME AND OPERATING A TELECOMMUNICATIONS SYSTEM

(75) Inventor: Frank Rodewald, Bedburg (DE)

(73) Assignee: Tenovis GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 11/083,099

(22) Filed: Mar. 16, 2005

(65) Prior Publication Data
US 2005/0245255 A1 Nov. 3, 2005

(30) Foreign Application Priority Data
Mar. 17, 2004 (DE) .................. 10 2004 013 316

(51) Int. Cl.
*H04Q 7/20* (2006.01)
(52) U.S. Cl. ............... 455/428; 455/427; 455/554.2
(58) Field of Classification Search ............ 455/428, 455/422.1, 12.1, 445, 550.1, 552.1, 553.1, 455/554.1, 554.2, 555, 427, 403; 370/331, 370/401
See application file for complete search history.

(56) References Cited
U.S. PATENT DOCUMENTS

| | | | |
|---|---|---|---|
| 5,659,878 A * | 8/1997 | Uchida et al. ............ 455/426.1 |
| 5,666,648 A | 9/1997 | Stuart ..................... 370/321 |
| 5,678,175 A | 10/1997 | Stuart ..................... 455/43.1 |
| 6,035,178 A * | 3/2000 | Chennakeshu et al. ..... 455/12.1 |
| 6,070,070 A * | 5/2000 | Ladue ..................... 455/419 |
| 6,879,584 B2 * | 4/2005 | Thro et al. ................ 370/352 |
| 6,999,770 B2 * | 2/2006 | Hirsbrunner et al. ........ 455/445 |
| 7,149,521 B2 * | 12/2006 | Sundar et al. ............ 455/435.1 |
| 2002/0101858 A1 * | 8/2002 | Stuart et al. ............. 370/352 |
| 2003/0058814 A1 * | 3/2003 | Kim ...................... 370/328 |
| 2003/0134650 A1 * | 7/2003 | Sundar et al. ............. 455/465 |
| 2004/0013097 A1 * | 1/2004 | Massa .................... 370/335 |
| 2004/0141484 A1 * | 7/2004 | Rogalski et al. ........... 370/338 |
| 2004/0196810 A1 * | 10/2004 | Kil et al. ................. 370/331 |
| 2005/0068938 A1 * | 3/2005 | Wang et al. .............. 370/352 |
| 2006/0291455 A1 * | 12/2006 | Katz et al. ............... 370/355 |

FOREIGN PATENT DOCUMENTS

| EP | 0 787 387 | 8/1997 |
|---|---|---|
| WO | 00/17803 | 3/2000 |
| WO | WO-0017803 | 3/2000 |

* cited by examiner

*Primary Examiner*—CongVan Tran
(74) *Attorney, Agent, or Firm*—Andrew Wilford

(57) ABSTRACT

A telecommunication system has a multiplicity of clients each with a multiplicity of subscribers connected by an access device to a long-distance network with a telecommunication apparatus for exchange (PDX). According to the invention between that network and the access device a wireless stretch is formed which can include a satellite link, a UMTS link, a WLAM link or WMAN link.

11 Claims, 4 Drawing Sheets

TELECOMMUNICATIONS SYSTEM, METHOD OF CONFIGURING SAME AND OPERATING A TELECOMMUNICATIONS SYSTEM

FIELD OF THE INVENTION

My present invention relates to a telecommunications system to a method of configuring that telecommunications system and to a method of operating a telecommunications system in which a plurality of customers each may have a multiplicity of telecommunications terminal devices capable of communicating over a telecommunication network and wherein the customers can utilize that telecommunications system independently from one another.

BACKGROUND OF THE INVENTION

Telecommunication systems serve numerous subscribers with respective terminal services. Large private telecommunication systems can have in excess of 10,000 subscribers or stations, each with a respective terminal device or a plurality of such terminal devices. These private systems, also referred to herein as telecommunications networks, can be linked, for example, by the QSIG into an overall telecommunications system whose participants are limited in number only by the maximum permissible length of the call numbers or subscribers numbers, i.e. the telephone number assigned to the terminal device.

Telecommunications networks of such large size only require a sufficient breadth of the spectrum of the field in which they are operated and if it is desirable to expand smaller telecommunications systems further, server based applications like CTI (Computer Telephony Integration) CRM (Customer Relations Management) and Call Center Techniques are used.

The increase in the utilization of telephone networks can be implemented differently at different costs. For example, server based applications and telephone exchange improvements require high capital cost which may be uneconomical in the case of smaller systems so that such improvements usually are not implemented in smaller telecommunications networks. For telecommunications networks which are linked to serve many customers, the distribution of the cost may make improvements tolerable by spreading the cost of the improved features over the number of subscribers. Two approaches of this type are represented by the Centrex service in an open network of Deutschen Telekom AG and the multicompany approach of a private telecommunications service.

In the Centrex service typical performance features are applied centrally for private telephone networks with open network drivers for many customers. The service utilizes the characteristics of a private network and characteristics of open networks. The network intelligence, namely, the control of performance or capability characteristics is in the open network and the interface between the open network and the private network which is a virtual network having a function of a gateway in an open gateway.

The multicompany approach is based upon a private network concept with communication at a specific location with the telephone network. In one application the communication system of a building or a communication system driven by a network driver is used as the basis. Such network drivers can be operated for example, by a company like the present assignee or the Regus Corporation of the United Kingdom.

The network technology in the private network is located at the campus and the interface to the open network is at the campus. The private network can in turn include a plurality of private telephone networks itself. A number of independent customers or served systems can utilize each telephone network independently. An administrator of the network drive of the system which operates the telephone network implements the performance features and as selected by the customer or utilizing enterprise and ensures that the subscribers or users of that customer or company are prepared.

The private telephone networks described in the literature however are not truly capable of satisfying all of the requirements of such systems and it therefore is not possible to provide for each individual customer or served company individually or simultaneously all combinations of performance or capability enhancements.

For that reason the operator of the campus network generally will provide packages of capability or performance features which are simultaneously offered and operated.

In one such system the number of firms which can be handled is limited to 64 and the telephone network is incapable of recognizing the idea or motion of the firm or the customer or the served enterprise. There is therefore a limitation in the number of customers which can be served or the number of performance features which can be made available. The performance features must therefore be compromised for example, in the formation of traffic groups.

The term "client" and the term "customer", as far as telephone services are concerned can be equivalent and each will generally refer to a plurality of subscribers, each having a terminal device and, from the perspective of the apparatus, a singular subscriber connection line connected to that device and identified in the apparatus to mean that device and the subscriber. In communications it is customary to refer to the subscriber and the terminal device interchangeably. With the aid of a calling number plan, the relationship between the subscriber line of a terminal device and an internal call number of the subscriber is made.

Furthermore, it is known to operate a telecommunications apparatus in an exchange of such telecommunications apparatuses, i.e. a number of telecommunications apparatuses so linked together that the exchange is formed by digital connection lines between the individual telecommunications apparatuses.

As the protocol enabling communication between these apparatuses and through these lines, either a standardized protocol (QSIG, DPNSS1), or a proprietary protocol (TNET, CORNET, . . . ), may be used. Telecommunications apparatuses in an exchange have devices to charge the use of the line per connection and for connection duration. The prior art provides an exchange of private telecommunications apparatuses each of which might have its own client.

Systems which are customer-based utilizing private telecommunication apparatuses are limited with respect to the mobility of the subscriber or the terminal device since such mobility is usually not part of the system plan and if present, must use an existing radio network. It is common, therefore, for mobile terminal devices to use a different network from the fixed communication system even of a specific client or enterprise. Any attempt to integrate the two in the past has resulted in limitations in utility of one or the other.

The drawbacks of prior systems can be seen from the following scenario:

An outside worker of a firm requires a completely different technological office environment from that of an inside worker of the firm of one located at the office of the firm. In some cases he may be located in a strange office environment and in that case must use the telecommunication equipment of the firm at which he is located and its services and functions. He cannot contact his clients with normal short internal and private call numbers but must use public and long calling numbers. His colleagues cannot contact him with short internal numbers but must use longer public call numbers. If he must use the telefax, he cannot normally use the numbers which his firm may provide. If he requires a data connection for a PC or other device, again he must use numbers which are foreign to him.

If he is not located in a foreign fixed environment but is in an automobile, bus, truck, house or construction trailer or the like, he must use a portable unit, and for example a PDA or PC which can be connected to the portable unit. In many cases such portable units may not even operate at a particular location. When his colleague or others contact him or he them is through short internal numbers, public long numbers must be used.

OBJECTS OF THE INVENTION

It is the principal object of the present invention, therefore, to provide a customer-based telecommunication system which can facilitate mobile telecommunications but without the drawbacks of earlier systems and with the performance features of nonmobile telecommunications systems.

It is also an object of this invention to provide an improved method of configuring a telecommunications system, an improved method of operating a telecommunication system and a telecommunication system operated by that method which has the advantages of integrating mobile telecommunications with a private fixed network.

SUMMARY OF THE INVENTION

The customer-based telecommunication apparatus according to the invention can operate like a service-provider system having a multiplicity of clients each with a multiplicity of terminal devices capable of use independently form one another. Each client has its terminal devices grouped with all terminal devices of each group having assigned thereto a common singular access identification. The respective groups of terminal devices can be those of individual enterprises and/or organizational units or themselves different clients as in service providers wherein each group of terminal devices corresponds to one of the clients or service providers. The telecommunication apparatus assigns via means for storing client identification numbers, such numbers to all participatory clients and access identification numbers to all terminal device groups.

Client identification numbers and access identification numbers are obtained from the E.164 call numbers of terminal devices, for example from evaluation-relevant parts thereof. The customer-based extension apparatus and advantageously calling number plans individual to certain clients and terminal groups of the client are thus divided in accordance with that calling number plan. The extension number in the telecommunication apparatus, therefore, can be used at least several times, a maximum of once for each terminal device group of each client. Connections between terminal devices of different groups can extend beyond a client or be completely within the extension apparatus or over a public net.

Applicant has developed a private communication apparatus in which the multiplicity of clients each has a multiplicity of terminal services which can be independently used as if there was only single client on the private exchange. This private exchange creates virtual private telecommunication apparatuses or centrals each with its own data collection and its data access structure for each client. Such a virtual apparatus can be allocated to each client or customer and can serve its subscribers independently and organizationally separately from the subscribers of other clients. Each client has a client-individual, freely choosable client call number plan which need serve only that client. Such a communication system based upon a private telecommunication apparatus can have any optional number of clients each with substantially any optional number of subscribers.

Within the virtual apparatus of a client, performance features can be provided both client-wide and also individually for the subscribers. This can be accomplished largely through an administrator of the client itself, for example by allocation of subscriber rights, especially in conjunction with office traffic or in the use of performance features. The registration and changing of data within the virtual equipment remains with the system administrator. This can be for example the configuration of traffic between virtual apparatuses of different clients and the unlocking or locking of hardware addresses. In this private communication apparatus, each client has its client identification number and the client identification numbers enable the assignment of virtual telephone units to the individual client.

The telecommunication system according to the invention has terminal devices connected to the telecommunication apparatus in which each terminal device is connected to an access unit which, via a long distance network, is connected to the telecommunication apparatus. The long-distance network of the present invention has a wireless stretch and as a result each terminal device can utilize a full range of functions of the telecommunication apparatus.

The wireless communication link can be a satellite link, a UMTS link, a WLAN link for small distances or a WMAN link for intermediate distances. The invention also comprises a method of configuring a telecommunications system comprised of:

a telecommunications network;

a multiplicity of telecommunication terminal devices producing and receiving telecommunications over an access device is interposed between each terminal device and telecommunications network;

a respective access device connected to at least one of the telecommunication terminal devices whereby each of the telecommunication devices of the telecommunications system is connected to a respective such access device and a long-distance transmission network including a wireless communication link between the telecommunications network and each access device, the method comprising the steps of:

allocating resources of the telecommunications network to wired long-distance transmission paths or directly to wireless transmission paths;

assigning the long-distance transmission paths to wireless transmission paths;

assigning a respective wireless transmission path or respective wired long-distance transmission path to the respective access device; and assigning a respective access device to the respective terminal device.

The invention includes a method of operating a telecommunications system with;

a telecommunications network;

a multiplicity of telecommunication terminal devices producing and receiving telecommunications over the network;

a respective access device connected to at least one of the telecommunication terminal devices whereby each of the telecommunication devices of the telecommunications system is connected to a respective such access device and a the access device is interposed between each the terminal device and the telecommunications network; and a long-distance transmission network including a wireless communication link between the telecommunications network and each access device, the method comprising the steps of:

switching communications between the telecommunications network and the access device at least in part over transmission paths including a wireless transmission path;

receiving a call; and switching a connection from the telecommunication network to a terminal device through the wireless transmission path.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
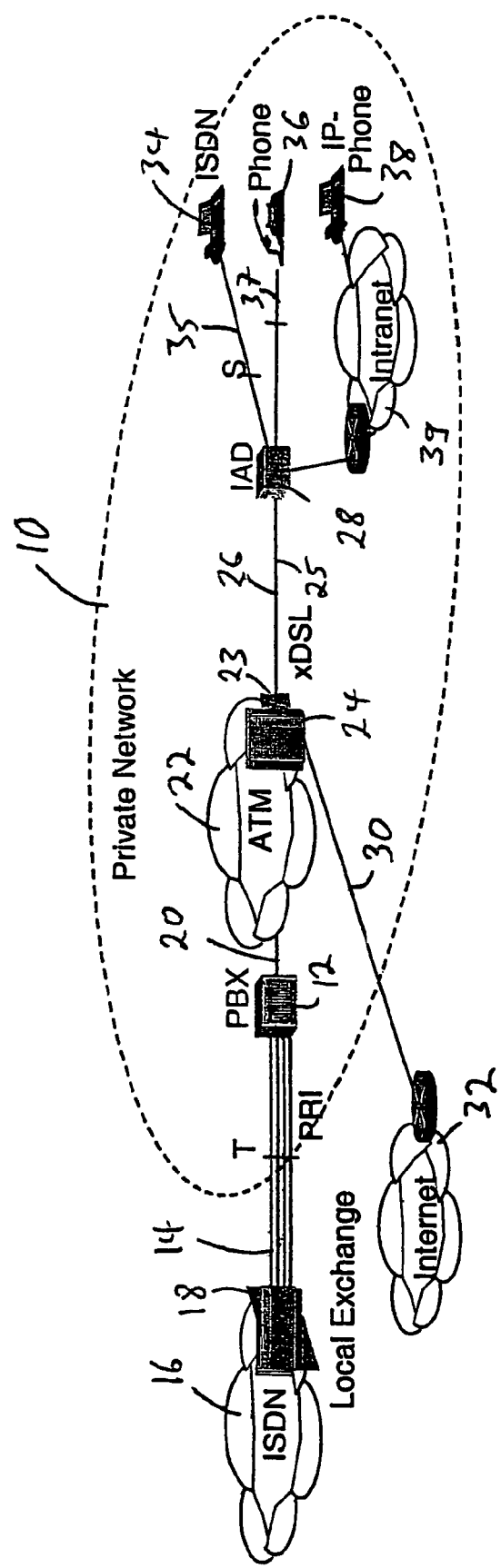
FIG. 1 is a diagram of a customer-friendly telecommunication system based upon a private telecommunication apparatus or central and which can be referred to as a private network.

FIG. 1 shows a customer-friendly communication system 10 utilizing a private telecommunication apparatus and forming, therefore, a private network which can be individual to a particular customer or client. That customer or client may be a company, an organization or even a service company with a number of clients or companies linked by the private network and connectable by that private network to outside lines of a public network or other telecommunication net.

Th private network 10 has a central telecommunication apparatus PBX 12 (Private Branch Exchange) individual to it. The central telecommunication apparatus PBX, referred to herein also as the "apparatus", the "central" or PBX 12 connected via one or more lines via trunks 14 to an open net ISDN 16, referred to also as the public network. This connection can be made through a primary rate interface PRI to a switching exchange 18 referred to herein as the local exchange of the public net at an interface T. The central telecommunication apparatus PBX 12 is also connected via line 20 to an ATM network 22. A DSL (digital subscriber line)connection 25 runs from the ATM network 22 via line 26 to an access unit, terminal device connector (integrated access device-IAD) 28. The integrated access device 28 is the access unit for the terminal devices connected to the telecommunication network.

The connection of the DSL line 25 to the ATM network is effected through a DSLAN (DSL access multiplexor) 23. A gateway 24 connects the telecommunication system 10 via line 30 with the internet 32. At the connecting device 28, a terminal device 34 in the form of an ISDN telephone is connected via a line 35 with a transfer point S as representative of one of a multiplicity of such devices which can be so connected.

Other typical terminal devices can be analog telephones 36 via their respective lines 37, IP telephones (IP=Internal Protocol) 38 through an intranet 39 as well as other telecommunication devices which can include telefax machines, servers and the like.

Thus the telephones 34, 36 and 38 are examples of any kind of telecommunications devices which can serve as terminal devices for the private network. The telecommunication apparatus PBX 12, the gateway server, the connection devices and terminal devices can be used or be provided in any optional number. The is connection between the telecommunication-PBX 12 and the IAD 28 can thus include a long-distance transmission link.

The Service Provider concept enables groups of employees or others of a firm to be located at different places without losing the convenience of being part of a large integrated telecommunication system. The terminal devices, therefore, need not be directly connected to the central of that system but can be ties to it through long range communication links such as an IAD, the DSL line and broad band communication networks like ATM or IP. The private network thus can extend within a particular country over long distances, outside any particular country and internationally, within a particular building or groups of buildings and without restriction between any groups of places throughout the world.

In order to facilitate this kind of access from practically anywhere, according to the invention, a wireless transmission stretch is provided within the private network 10 etc.

The subscriber groups which can be connected via the IAD or connecting device can be mobile in that the connection between the long-distance communication network (ATM, IP, . . . ) and the connecting device (IAD) need not have a fixed DSL connection but can involve a radiowave link. This system will operate with any optional long-distance communication network, not only an ATM, for example, with an IP network or any other radio network with optional other broad band system.

Figure 2:
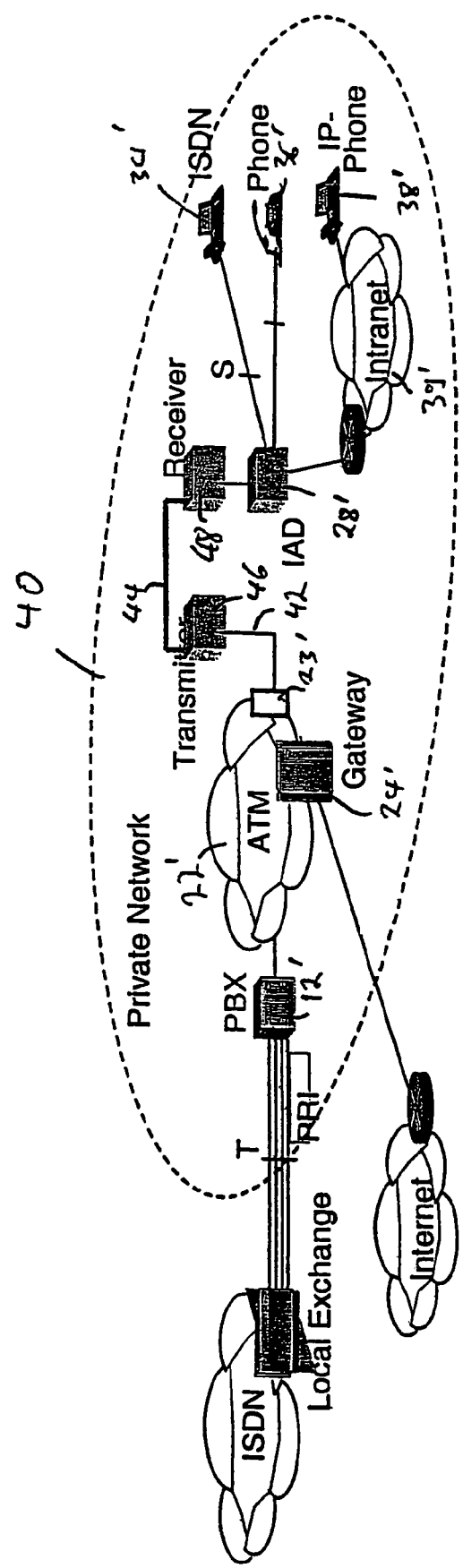
FIG. 2 is an illustration of a system of that type in accordance with the invention.

FIG. 2 shows a private telecommunication network 40 according to the invention in which many of the elements of the telecommunication system 10 of FIG. 1 are present. In FIG. 2 a DSL connection is provided at 42 to a wireless or radiowave communication stretch 44 in the long-distance communication network. For this purpose, to the DSLAM 23', a transmitter 46 is connected which can operate by converting the DSL protocol into a corresponding radiowave protocol. At the receiving side, the IAD 28' is connected with a receiver 48 which converts the received radio signal back into a DSL signal for the IAD.

According to a feature of the invention, the wireless stretch 44 can be a short distance WLAN connection or a WMAN connection for middle range distances (less than 50 km). The WMAN (Wireless Metropolitan Area Network) can operate with. Wireless Standard 802.16.

According to a further feature of the invention it is possible to eliminate completely the DSL links both at the transmitting side and the receiving side. At the transmitting side, for example, the DSLAM can be replaced by a gateway which transforms the ATM or IP signals into a protocol enabling the transmitter to match that protocol to the radio protocol. These two units can also be combined if desired. At the receiver side, the receiver transforms the radio signals into a specific protocol which can then be recognized by the access box or can work with all of that terminal devices. Nevertheless it has been found to be preferred to have the IAD operate through DSL since DSL protocols are very widely used and DSL is a relatively inexpensive technology.

According to another feature of the invention, the radio transmitter unit is connected directly to the telecommunication apparatus 12', i.e. to the PBX. It can also be advantageous to incorporate the radio receiver 48 directly into the IAD 28', i.e. to integrate these two units. The access unit, where desired, can also be integrated into the respective terminal devices.

Advantageously the telecommunication apparatus and the terminal devices together form a system which communicates with a private signaling protocol.

The subscriber group derived by a particular connecting device (IAD) can be mobile in the manner described since there need be no fixed DSL connection with the connecting device and a radio link is provided therewith. This has been found to be especially important in a service provider scenario.

Where the invention is used by the employer to service a number of employees, it will be apparent that it will also operate for employee groups which can be located at a common site or by employees located anywhere within the radio signal range with the same convenience as conventional office telephony.

The user can utilize the usual and available equipment (telephone, telefax, PC . . . ) without changing the approach or utilization techniques. All of the features of the telecommunication apparatus can be used as formerly. The user can independently of his or her location always use the same calling numbers that he otherwise would have selected, including internal call numbers (short numbers) hitherto used to reach colleagues at other locations. Other people can reach each person always using the same call numbers which may have been used previously for that purpose. The caller need select only his internal call number while callers within the firm may omit exchange access numbers.

In mobile offices, recreational vehicle facilities, construction trailers and like systems, complete office infrastructures can be incorporated independently of the particular location and without reinstallation expenses or the like.

In FIG. 2, elements which have not been described but are identical to corresponding elements of FIG. 1 have been indicated with the corresponding reference numeral primed.

Figure 3:
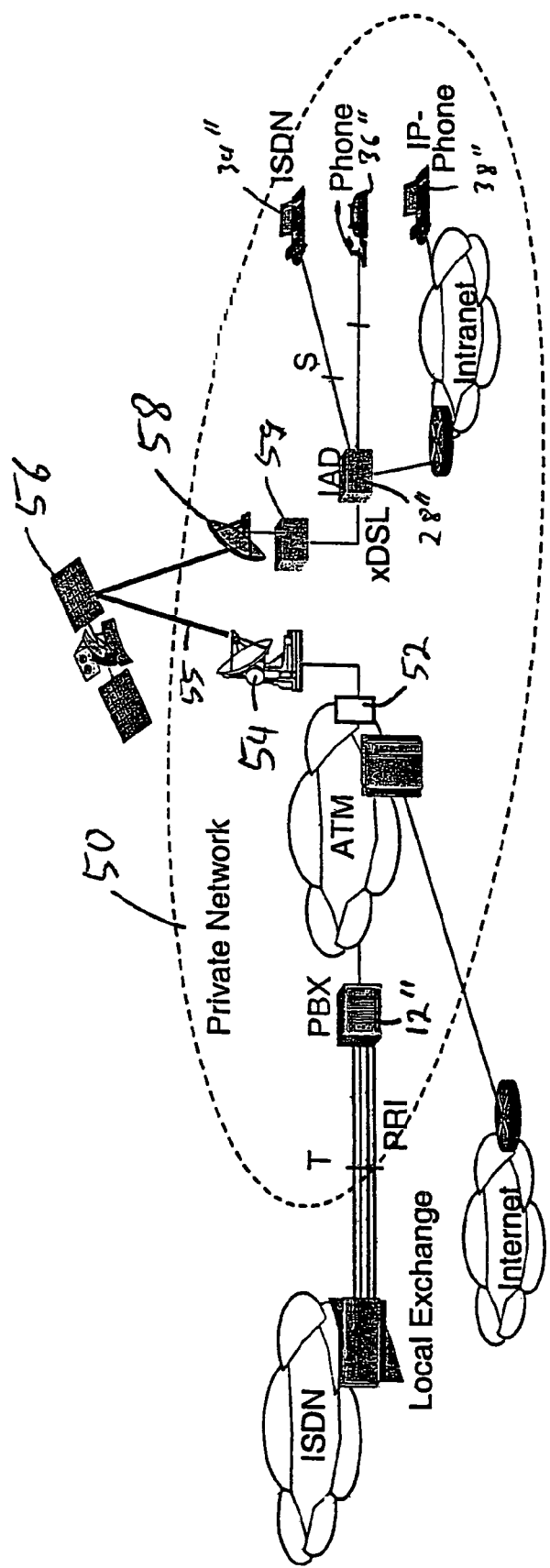
FIG. 3 is a diagram illustrating another embodiment of the system according to the invention.

FIG. 3 shows an embodiment of a telecommunication system according to the invention in which the axis device IAD is connected to the ATM net by a "DSL via satellite" system. "DSL via satellite" is used today by a number of providers. Many providers however utilize "DSL via satellite" only for the down link. The up link may be a conventional ISDM connection. In the system of FIG. 3, however, both up link and down link use "DSL via satellite".

More particularly, the telecommunication system 50 is shown in FIG. 3 and in accordance with the invention will have a number of elements corresponding to those of FIG. 10 and with corresponding reference numerals to FIG. 1 double primed. In this system, however, in the long-distance communication network, a gateway 52 is provided which converts the signal or data received from the ATM (or IP) in the ATM (or IP) protocol into the corresponding radio transmission protocol or channels the same and supplies the resulting signal to a transmitting antenna (54) for wireless or radio frequency communication over the stretch 55 to the satellite 56. From the satellite, the data or signals are retransmitted toward the earth.

With a receiving antenna 58 which is in the range of the satellite transmission and in a location served by the satellite, the retransmitted signals are picked up and converted from the radio protocol to the DSL protocol and supplied to the IAD 28" serving as the access device or the terminal devices. For that purpose the IAD 28" is connected directly with the converter 59.

By comparison with service provisions with fixed connections, the system of FIG. 3 requires the additional equipment in the provider network of a receiving antenna and a converter. If the office environment is in a vehicle, the travel within the range of the satellite is free from any problem with reception. The system can be used at any location in the satellite range, whether or not the subscriber is in motion. In the case of "DSL via satellite" there are antennas which automatically will redirect how the satellite automatically (see EP 111 9073 A2) the advantage of the first embodiment is that the receiving device can be relatively small.

Figure 4:
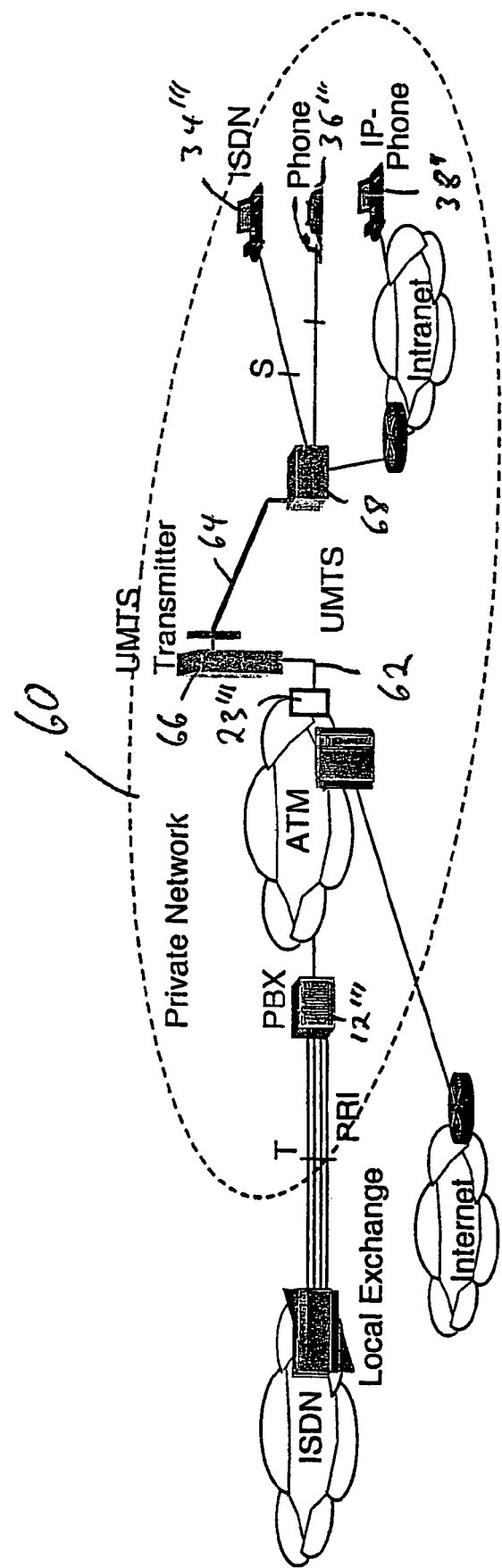
FIG. 4 is a diagram showing a fourth private network according to the present invention.

FIG. 4 shows an embodiment of a telecommunication system 60 according to the invention where the connection between the IAD 68 and the ATM net utilizes UMTS. In the telecommunication system 60, a number of elements corresponding to those of FIGS. 1 and 2 have been shown and indicated with the same numerals in a triple prime. In FIG. 4, a DSL connection 62 is provided between th DSLAM 23'" and a UMTS transmitted via a line 62. The UMTS transmitter 66 creates a wireless UMTS communication path 64 in the long-distance network. The DSL protocol tunnels to the UMTS transmitters 66 connected to a DSLAM 23".

At the receiving side a UMTS receiver 68 picks up the wireless signal in the DSL protocol and correspondingly serving as an IAD, services the terminal devices.

Alternatively, data from the ATM (or IP) can be transformed into the UMTS radio protocol directly in a gateway and transmitted by the sending antenna. In this case a receiving device, including the antenna will convert the signals either to DSL so that one can connect the IAD directly to the receiving device, or the receiver can be so configured that the terminal devices can be directly connected thereto. The latter variation does not require any stretch utilizing a DSL protocol.

The UMTS therein enables especially small receiving antenna to be used and is particularly suitable for employees who must carry around their "office environment" for example in a suitcase, attache case or carrying bag.

The method of configuring the telecommunication system with terminal devices connected to a telecommunications apparatus and wherein the terminal devices are connected to access units which are connected in turn with a long-distance transmission network with an apparatus and whereby the long-distance network has a wireless transmission stretch which is carried out in accordance with the invention by assigning the resources of the telecommunication apparatus to a wire-connected long-distance communications stretch or directly to the wireless communication stretch, assigning the long-distance communication stretch to the wireless stretch, associating the wireless stretch or the wired stretch to the access unit and assigning the access unit to the terminal device.

The apparatus can be operated by steps which involve switching the communication stretch between the telecommunication apparatus and the access unit including the wireless stretch contained therein, receiving a call and switch a connection from the telecommunication apparatus to a connected terminal device through the wireless stretch.

I claim:

1. A method of configuring a telecommunications system having:
   telecommunications equipment;
   a multiplicity of telecommunication terminals connected to the equipment;

a plurality of access devices; and a long-distance transmission network including a wireless transmission link and connected to at least one of the telecommunication terminals and to the equipment, the method comprising the steps of:

configuring the telecommunications network and the terminals to communicate through the network with a private signaling protocol;

allocating resources of the telecommunications equipment to wired long-distance transmission paths or directly to wireless transmission paths;

assigning the long-distance transmission paths to wireless transmission paths;

channeling signals in the long-distance transmission paths to an antenna;

transmitting the channeled signals with the private protocol from the antenna;

assigning a respective wireless transmission path or respective wired long-distance transmission path to the respective access device; and assigning a respective access device to the respective terminal device.

2. A method of operating a telecommunications system having:

telecommunications equipment;

a multiplicity of telecommunication terminals connected to the equipment;

a plurality of access devices; and a long-distance network having a wireless communication link and connected to at least one of the telecommunication terminals and to the equipment, the method comprising the steps of:

configuring the telecommunications network and the terminals to communicate through the network with a private signaling protocol;

switching communications between the telecommunications equipment and the access device at least in part over transmission paths including a wireless transmission path by channeling the communications using the private protocol to an antenna and transmitting the channeled communications from the antenna;

receiving a call; and switching a connection from the telecommunication network to a terminal device through the wireless transmission path.

3. A telecommunications system comprising:

telecommunications equipment having a range of functions;

a multiplicity of telecommunication terminals remote from the equipment, the telecommunication equipment and the terminals being configured to communicate via a private signaling protocol; and a long-distance transmission network using the private protocol connected between the telecommunication terminals and the equipment and including a wireless link, a transmitting antenna, respective access devices at the telecommunication terminals, and means for channeling information to the antenna using the private protocol so that each of the telecommunication terminals can use all the functions of the equipment.

4. The telecommunications system defined in claim 3 wherein the wireless communication link comprises a UMTS link.

5. The telecommunications system defined in claim 3 wherein the wireless communication link comprises a WLAN link for small distances or a WMAN link for intermediate distances.

6. The telecommunications system defined in claim 3 wherein the telecommunications equipment includes a radio transmitter connected to the telecommunications network.

7. The telecommunications system defined in claim 3 wherein the access devices each include a respective radio receiver.

8. The telecommunications system defined in claim 3 wherein each access device is integrated into the respective terminal.

9. The telecommunications system defined in claim 3, configured for use by a number of customers independently of one another.

10. The telecommunications system defined in claim 3 wherein the wireless communication link comprises a satellite link.

11. A method operating a telecommunications system comprising:

telecommunications equipment having a range of functions;

a multiplicity of telecommunication terminals remote from the equipment; and a long-distance transmission network connected between the telecommunication terminals and the equipment and including a wireless link, a transmitting antenna, respective access devices at the telecommunication terminals, and means for channeling information with the private protocol to the antenna so that each of the telecommunication terminals can use all the functions of the equipment, the method comprising the steps of:

configuring the telecommunications network and the terminals to communicate through the network with a private signaling protocol;

switching communications between the telecommunications equipment and the access devices at least in part over transmission paths including the wireless link by channeling the communications using the private protocol to the antenna and transmitting the channeled communications using the private protocol from the antenna;

receiving a call; and switching a connection from the telecommunication network to a terminal through the wireless transmission path.

* * * * *